June 24, 1930. P. J. ROONEY 1,768,374
LANTERN
Filed June 5, 1929
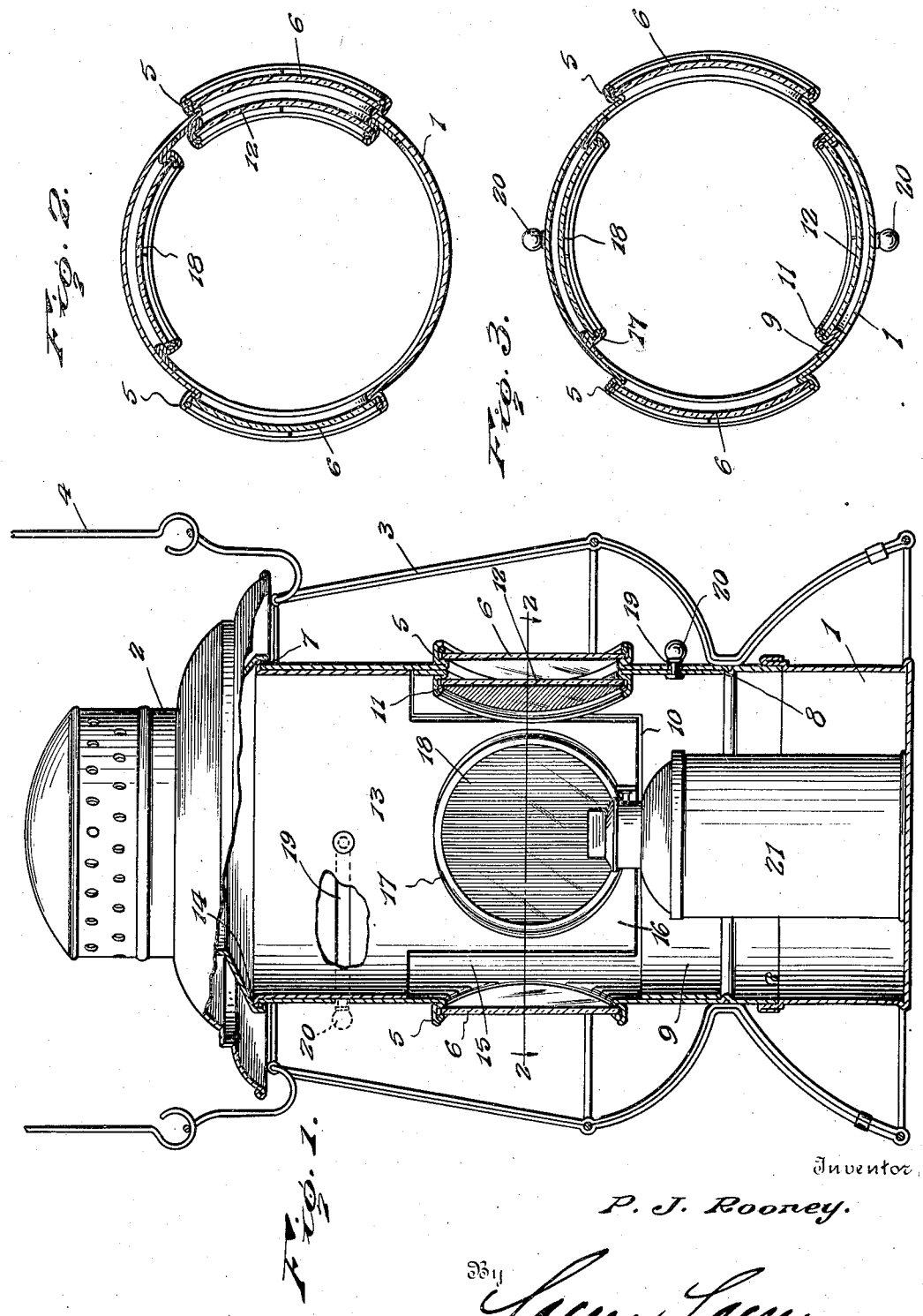
Inventor
P. J. Rooney.
By Lacey & Lacey, Attorneys Patented June 24, 1930

1,768,374

UNITED STATES PATENT OFFICE

PATRICK J. ROONEY, OF SUGAR NOTCH, PENNSYLVANIA

LANTERN

Application filed June 5, 1929. Serial No. 368,591.

The object of this invention is to provide a lantern particularly adapted for the use of trainmen and equipped with simple and easily manipulated means whereby from a single lantern light rays of a selected color may be projected so as to give a signal proper under existing conditions. The invention is illustrated in the accompanying drawing and will be hereinafter fully set forth.

In the drawing:

Figure 1 is a central vertical section through a lantern embodying the invention, Fig. 2 is a horizontal section on the line 2—2 of Fig. 1 showing one adjustment of the lenses, and Fig. 3 is a view similar to Fig. 2 showing another adjustment of the lenses.

The lantern body 1 is of cylindrical formation and may be of any suitable material. A ventilating cap 2 is secured on the top of the body in the usual manner and a guard frame 3 is also provided, a bail handle 4 being connected to the guard frame, as shown and as will be understood, whereby the lantern may be easily carried and operated to display the required signal. At diametrically opposite points of the body are lens holders 5 and in each of these holders is mounted a lens 6 of clear glass as is usual. At the upper end of the body 1, the edge thereof is turned outwardly, as shown at 7, to provide an annular shoulder and below the lens holders and openings, shown at 5, the body is provided with an inwardly projecting bead 8 which constitutes a rest and guide for a lower slide 9. This slide 9 is of annular form so that it fits closely to the inner surface of the body 1 and has its lower edge resting slidably upon the bead 8, as clearly shown in Fig. 1. The slide is cut-away, as shown at 10, and in the upstanding portion thereof is an opening around which is formed a grooved flange or rim 11 in which is fitted a lens 12 which is of colored glass. A similar slide 13 is mounted in the upper portion of the body and has its upper end edge turned outwardly, as shown at 14, to define a lip resting slidably on the shoulder 7. While the slide 13 is similar to the slide 9, it is relatively inverted so that its cut-away portion 15 will accommodate the upstanding portion of the lower slide and the depending portion 16 of the upper slide may move within the cut-away portion of the lower slide. The depending portion 16 of the upper slide has an opening formed therethrough and around the said opening is a grooved rim or flange 17 adapted to receive a lens 18 of colored glass. The lenses 12 and 18 are, of course, arranged in the same horizontal plane of the lantern as the lenses 6 and either colored lens may be brought into axial alinement with the clear lenses as may be desired. To manipulate the colored lenses, horizontal slots 19 are formed in the body 1 above and below the respective lens openings and respectively at diametrically opposite sides of the body. Each slide is equipped with a knob or handle 20 which extends through the respectively adjacent slot 19 so that the lenses may be easily shifted.

A lamp of any approved form will, of course, be secured upon the lower end of the body 1 so that the light therefrom will be disposed between the clear lenses and the light rays may pass through the lenses. As a matter of convenience, I have illustrated an oil burner 21 in the accompanying drawing, but it is to be understood that an electric lamp may be employed without involving any departure from the invention.

Normally the colored lenses will be disposed, as shown in Fig. 3, at opposite sides of the body and out of alinement with the clear lenses in which positions the lantern will show a clear light in both directions and will indicate a clear track or safe conditions. One colored lens is preferably red while the other lens is preferably green and obviously they may be shifted independently so as to be brought into alinement with the clear lenses. If dangerous conditions exist or for any reason it is desired to stop a train, the lens 18 which is colored red is shifted into axial alinement with the clear lenses, as shown in Fig. 2, and the light rays issuing through the adjacent side of the lantern will, of course, show red. At the opposite side of the lantern, the clear lens will be unobstructed but red rays will be reflected from the red lens so that a red light will show at both sides of the lantern. In like manner, if it is desired to signal for cautious advance, the lens 12 which is colored green is shifted into alinement with the clear lenses and a green light will show from both sides. Of course, when the red lens is in active position, the green lens will remain in inactive position and vice versa.

From the foregoing description, taken in connection with the accompanying drawing, it will be seen that I have provided a very simple structure whereby a single lantern may be adjusted to display a clear white light, a red light or a green light as circumstances may demand. The lens-carrying slides will fit closely to the inner surface of the cylindrical body of the lantern so that, while they may be shifted easily, they will be firmly held in the position in which they may be set. The structure of the slides is such that neither slide will interfere with the movement of the other slide and when a clear light is desired, both slides may be set so that the lenses carried thereby will be out of the range of the clear lenses. Because of the simplicity and compactness of the structure, the lantern may be produced at a low cost so that a saving to trainmen may be effected inasmuch as at a price very little, if any, greater than that now charged for a single lantern, the user will have all the advantages of three lanterns.

Having thus described the invention, I claim:

1. A lantern provided with openings at diametrically opposite points, clear lenses fitted over said openings, slides mounted within the lantern body and having reversely arranged cut-away portions whereby either slide may move within the cut-away portion of the other slide, and colored lenses carried by the respective slides and adapted to be moved into axial alinement with the clear lenses.

2. A lantern comprising a cylindrical body provided at diametrically opposite points with sight openings, clear lenses mounted over said openings, the body being provided with an inwardly projecting bead below said openings and having an outwardly extending shoulder at its upper end, a slide mounted within the body and resting on the bead and having an upstanding portion provided with a sight opening, a colored lens fitted over said opening whereby upon manipulation of the slide said lens may be brought into axial alinement with the clear lenses or may be disposed at one side between the clear lenses, a second slide provided at its upper edge with an outstanding lip resting on the shoulder of the lantern body, said second slide having a depending portion provided with a sight opening, and a colored lens mounted over said opening whereby upon manipulation of the slide said lens may be brought into axial alinement with the clear lenses or set in a position at one side between the clear lenses.

I testimony whereof I affix my signature.

PATRICK J. ROONEY.